United States Patent [19]

Mamalis et al.

[11] 3,723,429
[45] Mar. 27, 1973

[54] DI-HYDRO TRIAZINE DERIVATIVES

[75] Inventors: Patrick Mamalis, Reigate; Dennis J. Outred, London, both of England

[73] Assignee: Beecham Group Limited, Brentford, Middlese, England

[22] Filed: Nov. 6, 1969

[21] Appl. No.: 874,693

[52] U.S. Cl.................................260/249.9, 424/249
[51] Int. Cl. .............................................C07d 55/20
[58] Field of Search....................................260/249.9

[56] References Cited

UNITED STATES PATENTS 2,976,288   3/1961   Green et al........................260/249.9
3,105,074   9/1963   Mamalis...........................260/249.9

OTHER PUBLICATIONS

Mamalis et al.; J. Med. Chem., Vol. 8, pp. 684–691, (1965)

Primary Examiner—John M. Ford
Attorney—Jacobs and Jacobs

[57] ABSTRACT

N-substituted symmetrical di-hydrotriazine derivatives and salts are described having anti-malarial and antibacterial activity as well as effectiveness against some fungi and protozoa. A representative compound is 4,5-diamino-1,2-dihydro-2,2-dimethyl-1-[3'-(2,4,5-trichlorophenoxy)propyloxy]-1,3,5-triazine hydrobromide. The compounds can be prepared by reacting a substituted diguanide with a carbonyl compound in the presence of an acid catalyst to form a substituted triazine which may then be salified or acylated.

6 Claims, No Drawings

DI-HYDRO TRIAZINE DERIVATIVES

This invention relates to N-substituted symmetrical di-hydrotriazine derivatives and to processes for making them. Compounds within the scope of the present invention have anti-microbial activity of various kinds, including anti-malarial activity.

Accordingly the present invention provides novel N-substituted symmetrical di-hydrotriazine derivatives of the general formula

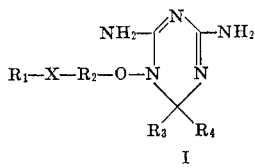

I where $R_1$ is a substituted or unsubstituted hydrocarbon radical or substituted or unsubstituted heterocyclic radical.

X is oxygen, sulphur or $NR_5$ where $R_5$ is hydrogen or substituted or unsubstituted lower alkyl or substituted or unsubstituted aryl lower alkyl, the lower alkyl part having one to six carbon atoms, $R_2$ is a divalent aliphatic group of one to 16 carbon atoms which may be substituted or unsubstitued $R_3$ is hydrogen or lower alkyl of one to four carbon atoms and $R_4$ is lower alkyl of one to four carbon atoms where $R_3$ and $R_4$ may be same or different and may be linked to form a spirocycloalkane or lowralkylspirocycloalkane group including the 2-carbon of the triazine ring, and salts thereof, except that when X is oxygen $R_1$ is not 1,2-diamino-4,6-dihydro-2-$R_3$-2-$R_4$ (1,3,5-triazin-1-yl).

One important characterizing feature of the compounds of the present invention is the presence of the atom or group X. Given the presence of the atom or group X compounds having useful and interesting properties are obtained over a wide range of structural variations in the organic group $R_1$ and over a somewhat more restricted range of variations of the organic groups $R_2$, $R_3$ and $R_4$.

Within the definition of $R_1$ we wish to include: aryl, including partially hydrogenated aryl and polycyclic aryl, aliphatic, including cycloaliphatic, saturated and unsaturated aliphatic and cycloaliphatic, heterocyclic and combinations of these groups all having one to 24 carbon atoms.

$R_1$ may for example be phenyl, naphthyl, phenanthryl, pyrenyl, anthryl, benzyl, cinnamyl, phenylethy, phenylpropyl, tetrahydronaphthyl and hydrophenyl; straight or branched chain alkyl, including methyl, ethyl, n-propyl, isopropyl, n-butyl, isobutyl, n-pentyl, isopentyl and n-decyl; cycloalkyl, including cyclopentyl, cyclohexyl, cycloheptyl and methylcyclohexyl; alkenyl, including vinyl, allyl and butenyl; alkynyl; heterocyclic, including pyridyl, quinolyl, furyl and thienyl.

The group $R_1$ may have a wide range of substituents: it may for example where the nature of $R_1$ itself is appropriate be mono- or poly-substituted by alkyl, including methyl, ethyl, cycloalkyl of three to eight carbon atoms including cyclohexyl, cyclopentyl and cycloheptyl; halogen including chlorine, bromine, nitro, halogeneo-lower alkyl, including mono-, di- and tri-chloro-, fluoro- or bromo- lower alkyl; lower alkoxy including methoxy, ethoxy, propyloxy; lower alkoxy carbonyl, including methoxycarbonyl, ethoxycarbonyl and propyloxycarbonyl; arylloweralkyl including benzyl, phenylethyl; carboxy; hydroxyl; mercapto; cyano; loweralkylthio, including methylthio, ethylthio; loweralkyl sulphonyl, hydroxyloweralkyl, loweralkoxy alkyl; cyano-loweralkyl; sulphonamido; amino; mono- and di-loweralkylamino, including methyl- and ethylamino. When $R_1$ has more than one substituent these may be the same or different. In general unless otherwise specified these groups may have one to 24 carbon atoms when the prefix "lower" is not used and one to six carbon atoms when the prefix "lower" is used.

Within the definition of $R_2$ we wish to include straight chain or branched divalent aliphatic groups both saturated and unsaturated. $R_2$ may for example be propylene, vinylene, $-(CH_2)_n-$ where $n$ is $1-16$, e.g., tetramethylene.

$R_2$ may be mono- or poly- substitued for example with hydroxy, lower alkoxy of one to six carbon atoms or halogen.

$R_3$ and $R_4$ may for example both be methyl, hydrogen and ethyl respectively or may be linked to form a spirocycloalkane group including the 2-carbon atom of the triazine ring for example spirocyclohexane or 4-methylcyclohexane.

When X is $NR_5$, $R_5$ may be for example hydrogen, methyl, ethyl or benzyl which may be substituted by halogen especially chlorine.

Although Formulas have been used herein in order to represent the compounds of the present invention, the nature and value of the present invention does not depend upon the precise theoretical correctness of these Formulas. The names and Formulas used herein are not intended to limit the invention to any specific tautomeric form or to any specific optical or geometric isomer.

Structures of the following form may for example contribute owards formula I

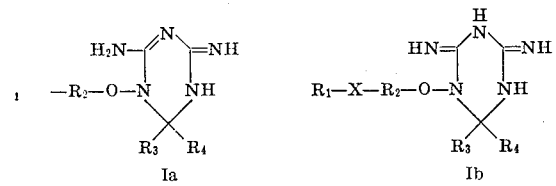

Ia      Ib

The compounds of the present invention are conveniently prepared in the form of acid addition salts, since the free base tends to somewhat unstable, and a wide range of acids may be used. If the compounds are to be applied pharmaceutically, then the acid should of course have acceptable pharmaceutical properties such as low toxicity.

Thus the compounds of the present invention may be made in the form of the monohydrohalic acid addition salts for example the hydrobromide or the hydrochloride. Other salts may be made however by simple reaction of base with acid and may be desirable in order to modify the properties of the product such as its toxicity, taste, physical form or rate of release into the body. For example the compounds may be made in the form of the picrate, saccharinate, acetate, acid maleate, acid phthalate, succinate, phosphate, p- nitrobenzoate, stearate, mandelate, N-acetyl-glycinate, pamoate, cyclohexyl sulphamate, citrate, tartrate, or gluconate.

Stable salts are normally formed with a ratio one molecule of triazine to one molecule of monobasic acid (or more than one molecule of triazine in the case of polybasic acids) but the possibility of having basic groups as X or as substituents in $R_1$ for example means that further quantitis of acid may be combined with the triazine in some cases.

The presence of the amino groups on the triazine ring of formula I creates the possibility of forming acyl derivatives by reaction with acylating agents such as acyl halides, anhydrides and acyl azides. One to four acetyl groups for example may be associated with the compound of formula I although in some cases it may be more difficult to make derivatives having higher numbers of acetyl groups. The present invention therefore includes compounds of formula I in the form of acyl derivatives (preferably loweraliphatic acyl, for example acetyl derivatives).

Compounds within the scope of the present invention have activity against bacteria, protozoa, parasites, including the Plasmodia of malaria, fungi including dermatophytes and Candida, and also display coccidiostatic properties in certain cases.

Thus activity has been observed against *Staph. aureus*, *Escherichia coli*, *Candida albicans*, *Proteus mirabilis*, *Pseudomonas pyocyanea* and *Streptococcus haemolyticus*.

For example 4,6-diamino-1,2-dihydro-2,2-dimethyl-1-[3'-(2,4,5-trichlorophenoxy) propyloxy]-1,3,5-triazine hydrobromide of formula

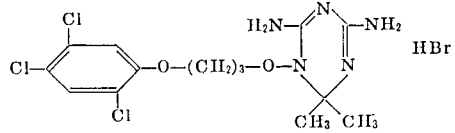

displays activity against cycloguanil-sensitive and cycloguanil-resistant strains of *lasmodium berghei* in the mouse.

In some series of compounds according to the present invention it is found that optimum activity is obtained when $R_1$ is aryl attached directly to X (see formula I). It is also preferred for X to be oxygen and/or for $R_2$ to be $-(CH_2)_n-$ where $n$ is $2-8$.

The present invention also provides a process for the preparation of the compounds of the present invention which comprises reacting a substituted diuanide of formula

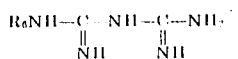

where $R_6$ is $R_1-X-R_2-O-$ or a group capable f conversion thereto with a carbonyl compound

in the presence of an acid catalyst to form a substituted triazine of formula III

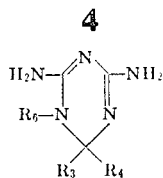

and converting $R_6$ where necessary into $R_1-X-R_2-O-$ and optionally where necessary forming a salt or acyl derivative.

Preferably the acid is a strong acid such as hydrochloric or formic acid and at least one molecular equivalent is used. The reaction may in some cases be carried out without any further solvents or diluents but usually an inert solvent such as a lower aliphatic alcohol e.g., methanol) is preferred.

When $R_6$ is $R_1-X-R_2-O-$ the substituted diguanide II becomes

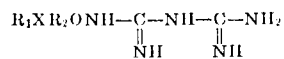

and accordingly the present invention also provides compounds of this kind for use as intermediates in the process of the presenJ invention. Compounds IIa may be made for example by reacting a bromide of general formula $R_1 X R_2 Br$ with benzhydroxamic acid and treating this with acid to form an oxyamine of formula $R_1 X R_2 O NH_2$ which is subsequently reacted with dicyandiamide.

Alternatively the group $R_6$ may be chosen so as to be convertible into the group $R_1 X R_2 O$. For example $R_6$ may be a group $R_7O$ which is capable of undergoing catalytic hydrogenolysis. Thus an $R_7ON-$ substituted trianzine may be formed from an appropriately substituted diguanide and then hydrogenolyzed to produce the hydroxy triazine IV

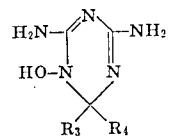

$R_7$ may for example be substituted or unsubstituted benzyl or substituted or unsubstituted naphthylmethyl and the hydrogenolysis may be carried out with hydrogen in the presence of a palladium catalyst.

The hydroxyJriazine IV may then be reacted in a variety of ways well understood by those skilled in the art to produce the desired substituted triazine of formula I.

It will be further understood by those skilled in the art that the side chain $R_1 X R_2 O$ may be built up or attached in stages either before or after the substituted diguanide II is converted to the substituted triazine III. Normally the minimum number of stages is employed to achieve optimum yields, for convenience and other factors.

Thus well-known ether-forming synthetic methods may be used to link the side-chain to the triazine with the O atom previously in place on either the side-chain or the trianzine. Typical examples are 1. the reaction of a halide with a hydroxyl compound with or without added base
2. the reaction of a reactive ester such as a sulphonate with a hydroxyl compound.

Analogous reactions may be used to attach the $R_1$ fragment to a partial side-chain comprising the $R_2$ fragment and with the X atom or group previously in place on either fragment.

The final product may be obtained in the form of an acid addition salt as a consequence of the reaction without the necessity of a separate step of salt formation but if necessary the additional step of reacting the free base with an acid to form a salt may be performed. Salts can be converted back to the free base by treatment with alkali e.g., KOH) and then converted to other salts as required by conventional means.

A further aspect of the present invention provides a process for the preparation of the compounds of the present invention which comprises reacting a triazine $$H_2N-\underset{Y_2-N}{\overset{N}{\diagdown}}\underset{N}{\overset{}{\diagup}}-NH_2$$
$$R_3 \quad R_4 \quad V$$

where $Y_2$ is a reactive group
with a compound $R_8Y_1$ where $R_8Y$ is a group capable of reacting with $Y_2$ so as to form the group $R_6$ (see formula II) and optionally where necessary forming a salt.

Preferably $Y_1$ and $Y_2$ are OH or derivatives of OH capable of reacting with each other to form an oxygen linkage. Thus $Y_1$ and $Y_2$ should have at least one oxygen atom between them. Conveniently $Y_2$ is OH or OM where M is a metal for example sodium, potassium or lithium and $Y_1$ is chlorine, bromine or iodine. Other reactive derivatives of the OH group include sulphonic acid derivatives.

In a preferred process a compound $R_1 X R_2 Z$ where Z is chlorine or bromine is reacted with the hydroxy triazine IV in an inert solvent or diluent. Examples of suitable solvents include dimethyl sulphoxide, dimethylformamide or ethanol.

The hydroxy triazine derivative IV is usually obtained in the form of an acid addition salt e.g., the hydrochloride) from which the free base may be liberated by one equivalent of base such as an alkali metal hydroxide e.g., potassium hydroxide) or sodium in ethanol or methanol. The mixture may then be evaporated and reacted in a suitable solvent e.g., dimethylformamide or dimethylsulphoxide). Preferably extra base is not added, since with two equivalents of sodium in alcohol for example a less pure product is obtained.

In a modified procedure, usually giving poorer yields, the hydrochloride of compound IV in dimethylformamide or dimethylsulphoxide is reacted with one equivalent of aqueous potassium hydroxide (using as little water as possible) and the resulting mixture reacted to give a triazine hydrohalide.

The $Y_2$ N-substituted triazine V may be made from an appropriately substituted diguanide as outlined above or by any other convenient method.

As indicated previously he side-chain $R_1 X R_2 O$ may be attached in a variety of ways and may be attached in one reaction or in fragments. For example a compound of general formula $$R_1 - X - R_2' - CH = CH_2$$

may be reacted with the hydroxy triazine IV where $R_240$ is the same as $R_2$ in formula I but minus two carbon atoms. Alternatively compounds within the scope of the present invention may be made by reacting the hydroxytriazine IV with formaldehyde in the presence of hydrochloric acid to form a compound of formula $$H_2N-\underset{Cl-CH_2-O-N}{\overset{N}{\diagdown}}\underset{N}{\overset{}{\diagup}}-NH_2$$
$$R_3 \quad R_4$$

and reacting this with a compound of formula $$R_1 - X - R_2'' Y_1$$

where $R_2''$ is the same as $R_2$ in formula I minus one carbon atom, to form compounds of general formula $$H_2N-\underset{R_1-X-R_2''-CH_2-O-N}{\overset{N}{\diagdown}}\underset{N}{\overset{}{\diagup}}-NH_2$$
$$R_3 \quad R_4$$

Alternatively certain hydroxy substituted compounds within the scope of the present invention may be made by reacting an appropriately substituted ethylene oxide with the hydroxy triazine IV as illustrated by the reaction scheme $$R_1X-CH_2-CH\underset{O}{\diagdown\diagup}CH_2 + HOTr \longrightarrow R_1X-CH_2CH-CH_2OTr$$
$$\quad\quad\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad\quad\quad OH$$

where Tr is used to represent $$H_2N-\underset{-N}{\overset{N}{\diagdown}}\underset{N}{\overset{}{\diagup}}-NH_2$$
$$R_3 \quad R_4$$

Similarly certain hydroxy substituted compounds within the scope of the present invention, may be made by reacting epichlorhydrin or a derivative with the hydroxy triazine IV to form a chloro-hydroxy substituted ether intermediate and further reacting this with an appropriately substituted compound having a hydroxyl group or reactive derivative thereof, as illustrated by the following reaction scheme $$ClCH_2-CH\underset{O}{\diagdown\diagup}CH_2 + HOTr$$
$$\downarrow$$
$$ClCH_2-CH-CH_2OTr \underset{HCl}{\overset{OH^-}{\rightleftharpoons}} CH_2-CH-CH_2OTr$$
$$\quad\quad |\quad\quad\quad\quad\quad\quad\quad\quad\quad\quad\quad\diagdown\diagup$$
$$\quad\quad OH\quad\quad\quad\quad\quad\quad\quad\quad\quad\quad\quad O$$
$$\downarrow R_1XH \quad\quad\quad\quad\quad\diagup R_1XH$$
$$R_1XCH_2-CH-CH_2OTr$$
$$\quad\quad\quad\quad |$$
$$\quad\quad\quad\quad OH$$

Reactions of the types illustrated above may clearly be performed using either the hydroxytriazine IV as a starting material or a triazine with a partial side chain already in place although in many cases such a partial side-chain triazine may be made from the hydroxytriazine originally.

Thus for example a compound

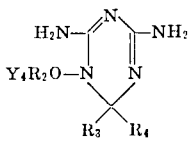

where $Y_4$ is a reactive group may be reacted with a compound $R_1Y_3$ where $Y_3$ is a reactive group and $R_1Y_3$ and $Y_4$ are capable of reacting so as to convert $Y_4$ into $R_1X$.

To provide a more specific example a compound $R_1Z$ where Z is bromine or chlorine may be reacted with a compound $$HOR_2OTr$$

to form a compound $R_1OR_2OTr$

The present invention also provids pharmaceutical compositions for use against the parasites of malaria comprising as active ingredient a compound according to the present invention together with a pharmaceutically acceptable carrier.

Thus the active compounds of this invention may be employed wherever effectiveness against the Plasmodia of malaria is indicated. The water solubility of the hydrochloride of the compound and most other salts is low and the hydrochloride is non-hygroscopic. When solutions are required it will be necessary to add solubilizing agents to the water, choose non-aqueous solvents, find a more soluble salt or prepare very dilute solutions.

Oral formulations are preferred and with the above proviso in connection with solutions, typical oral formulations will include tablets, pills, capsultes, sachets, granules, powders, chewing gum, suspensions, emulsions and solutions: particularly preferred oral formulations are tablets and capsuls. Where appropriate and where necessary the formulations may include diluents, binding agents, dispersing agents, surface-active agents, lubricating agents, coating materials, Flavoring agents, coloring agents, solvents, thickening agents, suspending agents, sweeteners or any other pharmaceutically acceptable additives, for example gelatin, lactose, starch, talc, magnesium stearate, hydrogenated oils, polyglycols and syrups. Where the formulations are tablets or capsules and the like they will represent pre-measured unit doses but in the case of granules, powders, suspensions and the like the formulations may be presented as premeasured unit doses or in multi-dose containers from which the appropriate unit dose may be withdrawn.

The injectable form may be an aqueous or nonaqueous solution, suspension, or emulsion in a pharmaceutically acceptable liquid e.g., sterile pyrogen-free water or parenterally acceptable oils) or mixture of liquids which may contain bacteriostatic agents, antioxidants or other preservatives, buffers, (preferably in the physiological pH range of 6.5 — 7.0) solutes to render the solution isotonic with the blood, thickening agents, suspending agents or other pharmaceutically acceptable additives. Such forms will be presented in unit does form such as ampoules or disposable injection devices or in multi-dose forms such as a bottle from which the appropriate does may be withdrawn, or as a solid form or concentrate which can be used to quickly prepare an injectable formulation. All formulations for injection are preferably rendered sterile. Suppositories containing the compound will also contain suitable carriers e.g., cocoa butter or polyglycols).

In addition to standard pharmaceutical additives there may be included within formulations of the compound other therapeutic agents, particularly including other antimalarials e.g., sulphonamides).

Insofar as the formulations of the present invention are novel this invention also provides a method of producing them.

Examples of the invention will now be described:

EXAMPLE 1

4,6-diamino-1,2-dihydro-2,2-dimethyl-1-[3'-(2,4,5-trichlorophenoxy) propyloxy]-1,3,5-triazine hydrobromide A mixture of 18.98 g. 2,4,5-trichlorophenol, 3.85 g. sodium hydroxide, 15.5 ml. water and 39.3 g. 1,3-dibromopropane was heated under reflux for 60 – 90 minutes, 25 ml. 14 percent aqueous sodium hydroxide was added and the mixture heated at 50°–70° for 30 minutes. Extraction with ether and evaporation of the dried ethereal layer gave, on distillation, 16.4 g. of 3-(2,4,5-trichlorophenoxy)-propyl bromide, b.p. $_{0.7}$—150°– 154° (mainly 150°), m.p 34°–5° , together with 2.4 g. of higher boiling material b.p.$_{0.7}$154°– 164° and a fore run of 1.74 g. oil.

A solution of 5.5 g. potassium hydroxide in 100 ml. methanol was refluxed with 15.23 g. 4,6-diamino-1,2-dihydro-2,2-dimethyl-1-hydroxy-1,3,5-triazine hydrochloride for 10–30 minutes, the mixture evaporated and the residual solid stirred with 25 g. of the previously prepared bromide in 100 ml. dimethylformamide for 3–24 hours at room temperature. The mixture was filtered, the filtrate evaporated and the residual solid stirred with acetone to give 23.7 g. product. Washing with water and with ether gave 19.12 g. 4.6-diamino-1,2-dihydro-2,2-dimethyl-1-[3'-(2,4,5-trichlorophenoxy) propyloxy]-1,3,5-triazine hydrobromide, 178°–181°.

EXAMPLE 2

4,6-Diamino-1,2-dihydro-2,2-dimethyl-1-[2'-(p-chloro-phenylthio)ethoxy]-1,3,5-triazine hydrobromide p-Chlorobenzenethiol (14.5 g., 0.1 mol.) dissolved in a methanolic solution of sodium hydroxide (4 g. in 200 ml.) was treated with dibromoethane (37.6 g., 2.0 mol.) and the mixture stirred and refluxed for 1.5 hours, cooled and a little insoluble material removed by filtration. The solvent was removed in vacuo, the oil was separated from the inorganic salts, washed with water, dried and distilled to give 1-(p-chlorophenyl)-2-bromoethyl sulphide (11.9 g. b.p. 116°/2 mm).

4,6-Diamino-1,2-dihydro-2,2-dimethyl-1-hydroxy-1,3,5-triazine hydrochloride (3.87 g.) was reacted in methanol with potassium hydroxide (1.4 g.), the methanol evaporated and the residue suspended in formdimethylamide and cooled at −10°C. The above bromide (5.05 g.) was added and the mixture stirred for several hours, the temperature being allowed to rise slowley to 20°C. When a clear solution had been obtained, the solvent was evaporated and the residual gum triturated with acetone to give a white solid (4.9 g.). After washing thoroughly with water and drying, the solid weighed 2.52 g. m.p. 193°–195°. Crystallization from ethanol gave material m.p. 202°. 4,6-Diamino-1,2-dihydro-2,2-dimethyl-1-[2'-(p-chlorophenylthio)ethoxy]1,3,5- triazine hydrobromide.

EXAMPLE 3

4,6-Diamino-1,2-dihydro-2,2-dimethyl-1-[2'-(2-Naphthoxy)ethoxy]-1,3,5- triazine hydrobromide 2-(2-Naphthoxy)ethyl bromide prepared from 2-naphthol and 1,2-dibromoethane, in a similar manner to that described in Example 1, had m.p. 90°–91°after crystallization from ethanol.

4.6-Diamino-1,2-dihydro-2,2-dimethyl-1-hydroxy-1,3,5-triazine hydrochloride (3.67 g.) was reacted in methanol with potassium hydroxide (1.4 g.), the methanol removed and the residue suspended in form-dimethylamide and stirred at room temperature with 2-(2-naphthoxy) ethyl bromide (5.0 g.) for 2 hours. Working up in the usual manner gave a white solid (3.4 g.) m.p. 195°–197°. Crystallization from ethanol gave pure 4,6-diamino-1,2-dihydro-2,2-dimethyl-1-[2'-(2-Naphthoxy)ethoxy]-1,3,5-triazine hydrobromide m.p. 196°.

EXAMPLE 4

4,6-Diamino-1,2-dihydro-2,2-dimethyl-1-[3'-(p-nitrophenoxy)propyloxy]-1,3,5-triazine hydrobromide 3-(p-Nitrophenoxy)propyl bromide prepared from p-nitrophenol and 1,3-dibromopropane, in a similar manner to that described in Example 1, had m.p. 50°–52°.

The free base from 2.96 g. 4,6-Diamino-1,2-dihydro-2,2-dimethyl-1-hydroxy-1,3,5-triazine hydrochloride was suspended in formdimethylamide and treated with the above bromide (4.0 g.) at room temperature. Working up in the usual manner gave 4,6-diamino-1,2-dihydro-2,2-dimethyl-1-[3'-(p-nitrophenoxy)propyloxy]-1,3,5-triazine hydrobromide (4.25 g.), m.p. 216°–217°.

EXAMPLE 5

4,6-Diamino-1,2-dihydro-2,2-dimethyl-1-[3'-(2,4-dinitro-anilino)-propyloxy]-1.3.5-triazine hydrochloride 3-(2,4-Dinitroanilino)propan-1-ol prepared from 2,4-dinitrochlorobenzene and propanolamine in methanol con taining sodium acetate, formed yellow needles, m.p. 72°, after crystallization from methanol.

The above material (10 g.) was dissolved in chloroform (15 ml.) and dimethylaniline (8 ml.). A solution of thionyl choride (5 ml.) in chloroform (10 ml.) was slowly added with stirring; when the addition was complete, the mixture was refluxed gently for 5 minutes, cooled and poured onto a mixture of ice and N-HCl (100 ml.). The yellow solid which precipitated (5.84 g.) was the required 3-(2,4-dinitroanilino)propyl chloride and had m.p. 82°.

The above chloride (2.6 g.) was added in portions to a suspension of 4,6-diamino-1,2-dihydro-2,2-dimethyl-1,3,5-triazine (1.57 g.) in formdimethylamide cooled to 0°C, the mixture allowed to come to room temperature and stirred for 3 hours. Working up in the usual manner gave a first crop (0.7 g.) of 4,6-diamino-1,2-dihydro-2,2-dimethyl-1-hydroxy-1,3,5-triazine hydrochloride, the second crop of solid, after washing with water, weighed 1.03 g. and was the required 4,6-diamino-1,2 -dihydro-2,2-dimethyl-1-[3+-(2-4-dinitroanilino)-propyloxy]-1,3,5-triazine hydrochloride, m.p. 220°–224°.

EXAMPLE 6

4,6-Diamino-1,2-dihydro-2,2-dimethyl-1-[2-(n-butyloxy) ethoxy]-1,3,5-triazine hydrochloride 2-(n-Butyloxy)ethyl chloride was prepared by the reaction of thionyl chloride with 2-(n-butyloxy)ethanol ("Butyl celosolve") and had b.p. 60°/1.5 mm.

4,6-Diamino-1,2-dihydro-2,2-dimethyl-1-hydroxy-1,3,5-triazine hydrochloride (7.7 g.) disso'ved in methanol was treated with a solution of potassium hydroxide (2.8 g.) in methanol as previously described. The "Hydroxy triazine base" formed was suspended in formdimethylamide and the n-butyloxyethyl chloride (6.0 g.) added. The mixture was stirred and heated on a steam-bath for 5 hours. Working up in the usual manner gave 2.5 g. of the required triazine 4,6-diamino-1,2-dihydro-2,2-dimethyl-1-[2-(n-butyloxy)ethoxy]-1,3,5-triazine hydrochloride, m.p. 208°.

EXAMPLE 7

4,6-Diamino-1,2-dihydro-2,2-dimethyl-1-hydroxy-1,3,5-triazine hydrochloride

1. Benzhydroxamic acid (137 g. 1.0 mol.) and I.M.S. (1.5 liters are placed in a flask equipped with a stirrer, dropping funnel and condenser, and stirred until solution is complete. A solution of NaOH (40 g., 1.0 mol.) in water (100 ml.) is added with vigorous stirring. The sodium salt of benzhydroxamic acid may precipitate at this state.

Benzyl bromide (170 g., 120 ml.) is added dropwise over 45 minutes, the mixture gradually becomes clear, leaving only a small amount of inorganic material undissolved. The reaction is preferably left at room temperature for 3 days, refluxing for 1 – 2 hours will give slightly lower yields.

The solvent is removed under reduced pressure and the oily residue is dissolved in ethyl acetate and washed several times with water. The solvent extract is dried with magnesium sulphate, filtered and evaporated to dryness un or vacuum.

The solid residue is triturated with ether and collected to give the required benzyl benzhydroxamate ($C_6H_5CONHOCH_2C_6H_5$) m.p 100°–102°C.

2. The benzyl benzhydroxamate (170 g) is dissolved in methanol (500 ml.) and concentrated hydrochloric acid (165 ml.) is added. The mixture is refluxed for 3 hours, filtered hot, and allowed to crystallize. The solid collected by filtration is washed well with ether, until no smell of methyl benzoate remains. Yield of aminooxymethylbenzene hydrochloride:

First crop 120 g. m.p. 227°– 230°(sealed tube) Concentration of the mother liquors and treatment with ether gives a further crop, 20 g. m.p. 220°–5°(sealed tube).

Total yield = 140 g. (ca. 90%)

3. Amino-oxymethyl benzene hydrochloride (97.5 g.) and dicyandiamide (51.4 g.) are dissolved in I.M.S. (300 ml.) with stirring and warming. The mixture is then refluxed for 3 hours, filtered if necessary, and evaporated under redcued pressure. The oilyresidue is dissolved in water and treated with strong aqueous NaOH (ca. 6N) with stirring. The diguanide base which separates, slidifies on cooling and is collected, washed with water and dried.

The yield of benzyloxy diguanide base is 95 – 100 g. m.p. 98°– 100°(80%)

4. Benzyloxydiguanide base (52 g.) is dissolved in I.M.S. (200 ml.) and concentrated hydrochloric acid (43 ml.) is added, followed by acetone (200 ml.). Preferably, the reaction is left at room temperature for 3 days but a 2 – 3 hour reflux period will give slightly lower yields. Some triazine usually separates, and may be collected by filtration, washed with water and dried.

The mother liquors are evaporated to dryness and the residue triturated with acetone, to give a white solid. The solid is collected washed with water and dried.

Total yield of 4,6-diamino-1,2-dihydro-2,2-dimethyl-1-benzyloxy-1,3,5- triazine hydrochloride 61 g. m.p. 204°— 6°(80%).

5. 41 Parts of 4,6-diamino-1,2-dihydro-2,2-dimethyl-1-benzyloxy-1,3,5-triazine hydrochloride dissolved in 320 parts of ethanol and 220 parts of water was shaken with hydrogen and 0.25 to 1.0 parts of 10 percent palladized charcoal catalyst, that is a catalyst composed of acid washed active charcoal (90 parts) on which has been adsorbed ten parts by weight of metallic palladium in a finely divided form, at room temperature and atmospheric pressure until the uptake of hydrogen ceased. The catalyst was filtered off and the filtrate evaporated to dryness to give 4,6-diamino-1,2-dihydro-2,2-dimethyl-1hydroxy-1,3,5-triazine hydrochloride (24.5 parts), m.p. 234°– 235°C (decomp.). Crystallization hydrochloride (24.5 parts) m.p. 234°– 235°C (decomp.). Crysta'lization from ethanol gave needles, m.p 237°C. (decomp.). The reduction described in this Example may be effected using a platinum catalyst as described below:

11 Parts of 4,6-diamino-1,2-dihydro-2,2-dimethyl-1-benzyloxy-1,3,5-triazine hydrochloride dissolved in 200 parts methanol and 100 parts water were shaken with hydrogen and platinic oxide at room temperature and atmospheric pressure until a 10 percent excess over the theoretically calculated hydrogen uptake was observed. Hydrogenation was stopped, the catalyst removed and the clear filtrate evaporated to dryness at reduced pressure. The solid residue was triturated with acetone and the 4.6-diamino-1,2-dihydro-2,2-dimethyl-1-hydroxy-1,3,5-triazine hydrochloride collected in theoretical yield, m.p. 234° (decomp.).

EXAMPLE 8

4,6-Diamino-1,2-dihydro-2,2-dimethyl-1-[3'-(2,4,5-trichlorophenoxy)propyloxy ]-1,3,5-triazine hydrobromide 1. 3-(2,4,5-trichlorophenoxy)-propyl bromide 2,4,5-Trichlorophenol (39.5 g.) (1 mol.) was dissolved in 25% NaOH solution. (33 mls.) and 1,3-dibromopropane (81 g., 2 mol) added. The mixture was stirred and heated to gentle reflux for 2 hours; the heating was removed and 14% NaOH solution (51 ml.) was added and the mixture held at 50°–70° for 30 minutes. The reaction was cooled and the lower layer separated and washed five times with water. The oil was distilled at 1 mm. to give i. 30°–60° 25 g. $n_D^{23}$ = 1.5230 (Recovered dibromopropane + water).

ii. 130°–60° 50 g. $n_D^{23}$ = 1.5838 (Required bromide slowly solidifies to m.p. 34°–35°).

2. 3-(2,4,5-Trichlorophenoxy)-propyl benzhydroxamate

Benzhydroxamic acid (22.5 g.) was dissolved in methanol (200 ml.) and a solution of NaOH (4.8 g.) in water (15 ml.) was added with stirring. 3-(2,4,5-Trichlorophenoxy)-propyl bromide (37 g.) was then added, the mixture refluxed for 1 hour and then left to stand for several days. The solution was evaporated under reduced pressure, and the residual gum was dissolved in ether (some inorganic material was removed by filtration). The there extract solidified on evaporation, and the solid was crystallized from petrol ether (40°–60°)/ethyl acetate. A total of 30 g. benzhydroxamate m.p. 73°–5° was obtained in two crops. A sample recrystallized from the same solvents had m.p. 76°77°.

3. 3-(2,4,5-Trichlorophenoxy)-propyloxyamine hydrochloride

The benzhydroxamate (32.7 g.) from (3) above was treated with a mixture of concentrated HCl (18.5 ml.) and methanol (300 ml.) and the mixture was refluxed for 3 hours. After evaporation of the solvent, the residual oil was cooled and ether was added. The solid which precipitated was collected, washed with ether and dried (21 g.), m.p 134°–6°.

4. 3'-(2,4,5-Trichlorophenoxy)-propyloxy diguanide 2,4,5-Trichlorophenoxypropyloxyamine hydrochloride (61.4 g.) from stage 3, was dissolved in ethanol (1 liter and dicyandiamide (25.2 g.) was added. The mixture was stirred and refluxed for 3 hours, when the solvent was evaporated under reduced proessure.

The residue was dissolved in water (ca. 300 ml.) and basified with strong aqueous NaOH solution, an oil separated which soon solidified. The solid was collected by filtration, washed with water and petrol and ried at 60°, to give a pale pink solid (49.5 g.), m.p. 107°–110°.

A small sample was crystallized from ethyl acetate and had m.p. 125°–6° (analytically pure).

5. 4,6-Diamino-1,2-dihydro-2,2-dimethyl-1-[3'-(2,4,5-trichlorophenoxy)-propyloxy]-1,3,5-triazine hydrobromide The diguanide (45 g.) from stage 4 was dissolved in methanol (200 ml.) and concentrated hydrochloride (25 mls.) and acetone (300 ml.) were added. The reaction was allowed to stand for 3 days at room temperature. The solvent was evaporated under reduced pressure and the residual gum triturated with acetone to yield the required triazine (23.5 g.), m.p. 187°–9° plus a small second crop (weight not recorded), m.p.1 181°–6°. The first crop material analyzed correctly without further crystallized.

EXAMPLE 9

4,6-Diamino-1,2-dihydro-2,2-dimethyl-1-[2-(2-naphthoxy)-ethyloxy]-1,3,5-triazine hydrochloride 1. 2-(2-Naphthoxy)-ethyl benzhydroxamate 2-(2-Naphthoxy)ethyl bromide, m.p. 90°–91°(see Example 3) (21.4 g.) was dissolved in methanol (50 ml.) and added slowly to a solution of sodium benzhydroxamate (15.05 g.) in methanol (100 ml.). The mixture was then refluxed vigorously for 6 hours. Inorganic solid was removed by filtration, and the solvent evaorated under reduced pressure. The residual gum was dissolved in ethyl acetate and washed several times with water. The solvent layer was dried with magnesium sulphate, filtered and evaporated. The residual gum was triturated with petroleum ether (b.p. 60°–80°) and the required benzhydroxamate crystallized (15.6 g.), m.p. 90°–93°. A small amount t was recrystallized from ethyl acetate to give an analytically pure sample, m.p. 100°–1.

2. 2-(2-Naphthoxy)-ethyloxyamine hydrochloride 2-(2-Naphthoxy)-ethyl benzhydroxamate (7.5 g.) was dissolved in methanol (30 ml.) and concentrated hydrochloric acid (10 ml.) added. The mixture was refluxed for 3 hours. After 2 hours, solid began to separate; the reaction was cooled and filtered to yield 4.6 g. of the required oxyamine, m.p. 192°–4°. A small quantity was recrystallized from methanol to yield an analytically pure sample, m.p. 195°.

Evaporation of the mother liquors and treatment of the residue with ether gave a further 0.9 g. of slightly less pure product.

3. 2-(2-Naphthoxy) ethyloxydiguanide 2-(2-Naphthoxy) ethyloxyamine hydrochloride (7.8 g. was dissolved in ethanol (100 ml.) and dicyandiamide (4.1 g.) added. The mixture was then refluxed for 3 hours, filtered and evaporated under reduced pressure. The residual gum was dissolved in water by warming, and the solution basified with strong NaOH solution. An oil separated, which slowly crystallized; after washing the solid with water and petroleum ether (b.p. 60°–80), the solid (8.1 g.) had m.p. 135°–7°. A sample, recrystallized from ethyl acetate, had m.p. 139°–40° and analyzed correctly for the required diguanide.

4. 4,6-Diamino-1,2-dihydro-2,2-dimethyl-1-[2-(2-naphthoxy)-ethyloxy]-1,3,5-triazine hydrochloride 2-(2-Naphthoxy)ethyloxydiguanide (8.0 g.) was dissolved in methanol (50 ml.) and concentrated hydrochloric acid (8 ml.) and acetone (75 ml.) were added. The mixture was allowed to stand for 3 days at room temperature. The solvent was evaporated under reduced pressure, and the residue triturated with acetone, to give the required triazine (5.4 g.), m.p. 190°–3. Crystallization from ethanol gave the analytically pure triazine, m.p. 195°–6° (c.f. Example 3).

EXAMPLE 10

Preparation of 4,6-Diamino-1,2-dihydro-2,2-dimethyl-1-[3'-(cycloheptyloxy)-propyloxy]-1,3,5-triazine hydro- chloride 1. A mixture of cycloheptanone (43.3 g.), benzene (250 ml.) and p-toluene sulphonic acid (0.5 g.) was refluxed for a few minutes and then allowed to distil until 50 mls. of solvent-water mixture were collected. 1,3-Propanediol (29.4 g.) was added to the reaction and the mixture refluxed for 5 hours. The water produced in the reaction was collected in a Dean & Stark apparatus until the volume reached 7 ml. The solvent was then evaporated and the residue distilled at 12 mm pressure. The fraction boiling at 127°–32°, 23.5 g., $n_D^{23} 1.4791$ was the required product, 1,5-dioxaspiro (5.6) dodecane.

2. Anhydrous aluminum chloride (14 g.) was dissolved in dry ether (100 ml.) and filtered into a 1liter 3-neck flask fitted with a stirrer, condenser and dropping funnel. Lithium aluminum hydride (1.5 g.) dissolved in dry ether (100 ml.) was added dropwise at room temperature and stirred for 30 minutes. The 1,5-dioxaspiro (5,6) dodecane (7.3 g.), prepared above and dissolved in ether, was added at such a rate that the reaction refluxed gently; the reaction was continued at room temperature, with stirring, for a further 2 hours.

The reaction was now cooled strongly and 10 percent aqueous $H_2SO_4$ was added slowly until all the precipitated solid had dissolved. The ether layer was then separated and washed with water until neutral. The solvent layer was dried over $MgSO_4$, filtered and evaporated. The 3-cycloheptyloxypropanol residue was a colorless mobile oil, giving only one peak on G.L.C. and 'ne spot on T.L.C. It was therefore brominated without further purification.

3. The 3-cycloheptyloxypropanol from the last reaction was dissolved in benzene and cooled to −10°. $PBr_3$ (3 ml.) in benzene (15 ml.) was added dropwise with stirring. The temperature was then allowed to rise to about 20° and then heated to 50° for 1 hour. The mixture was cooled and washed with water, $NaHCO_3$ and water. The solvent layer was dried with $MgSO_4$ and the solvent removed to give 3-cycloheptyloxypropyl bromide, as a colorless oil, was homogenous by T.L.C. and G.L.C. Yield (5.3 g.).

4. The bromide prepared above was reacted with the 4,6-diamino-1,2-dihydro-2,2-dimethyl-1-hydroxy-1,3,5-triazine base derived from 3.9 g. of the hydrochloride, in DMF at −10°. After working up in the usual manner, a white solid (7.5 g.), m.p. 110°, was obtained. This solid was washed with water and recrystallized from EtOH to give pure 4,6-diamino-1,2-dihydro-2,2-dimethyl-1-[3'-(cycloheptyloxy)-propyloxy]-1,3,5-triazine hydrochloride, m.p. 133°–5° (5.6 g.)

EXAMPLE 11

4,6-Diamino-1,2-dihydro-2,2-dimethyl-1-[3'-(4-cyclohexylphenoxy)propyloxy]-1,3,5-triazine hydrobromide 4-Cyclohexylphenoxypropyl bromide was prepared b y a method similar to that described in Example 1 from 4-cyclohexylphenol and dibromopropane in the presence of NaOH The bromide p.p. 150°–160°/2 mm., $n_D^{20}$ 1.5468, slowly solidified to give a waxy white solid m.p. 45°.

The free hydroxytriazine base was prepared from 4,6-diamino-1,2-dihydro-2,2-dimethyl-1-hydroxy-1,3,5-triazine hydrochloride (3.87 g.) by reaction with a methanolic solution of KOH (1.4 g.). The residue after evaporation of the solvent was suspended in form-dimethylamide and stirred at room temperature for two days with the 4-cyclohexylphenoxy propyl bromide (5.94 g.). The reaction mixture was filtered and vaporated under reduced pressure. The residue was triturated with acetone, the solid was collected by filtration, and washed with water and dried. The product was the required triazine m.p. 204°–207°(5.48 g.). 4,6-Diamino-1,2-dihydro-2,2-dimethyl-1-[3'-(4-cyclohexylphenoxy) propyloxy]-1,3,5-triazine hydrobromide.

EXAMPLE 12

4,6-Diamino-1,2-dihydro-2,2-dimethyl-1-[3'-(4-chloro-2-cyclohexylphenoxy)propyloxy]-1,3,5-triazine hydrobromide 4-Chloro-2-cyclohexylphenoxyropyl bromide was prepared in a similar manner to that described in Example 1. It had b.p. 165°–175°/1.5 mm., $n_D^{20}$ 1.5530.

The bromide (6.63 g.) was reacted with the free hydroxytriazine base obtained from hydroxytriazine hydrochloride (3.87 g.) suspended in formdimethylamide as described in Example 11. After stirring for 24 hours at room temperature, the reaction mixture was filtered and evaporated to dryness.

The residue was stirred with acetone, filtered, and the solid washed with water and dried. The crude triazine had m.p. 220°–222°, and was recrstallized from ethanol ti give the pure material, m.p. 225°(5.35 g.), 4,6-diamino-1,2-dinydro-2,2-dimethyl-1-[3'-(4-chloro-2-cyclohexylphenoxy)propyloxy]-1,3,5-triazine hydrob romide.

EXAMPLE 13

Di-acetyl derivative of 4.6-diamino-1,2-dihydro-2,2-dimethyl-1-[3'-(2,4,5-trichlorophenoxy)propyloxy]-1,3,5-triazine 5 g. of the free base of the tital compound was heated with 25 ml. redistilled acetic anhydride on a steam bath for 5 minutes and the reaction mixture evaporated to dryness under reduced pressure, followed by extraction with ethyl acetate, washing with water, crystallization and recrystallization from ethanol. The di-acetyl derivative was obtained as small white needles m.p.1 171°–172°C.

EXAMPLE 14

Tablets of 4,6-diamino-1,2-dihydro-2,2-dimethyl-1-]3'-(2,4,5-trichlorophenoxy)propyloxy]-1,3,5-triazine hydrobromide One tablet contains 10 mg. of active ingredient.
Formulation for production of 100,000 tablets (approximately 15 kg.)

| | |
|---|---|
| Active ingredient | 1,000 grammes |
| Maize starch (6 –9% moisture limit) | 1,500 grammes |
| Gum. Acacia powder | 500 grammes |
| Lactose | 8,000 grammes |
| Icing Sugar | 4,500 grammes |
| Talc | 200 grammes |
| Magnesium stearate | 100 grammes |
| Liquid paraffin | 15 grammes |
| Water | approx. 1 liter |
| N.B. Theoretical yield | 100,000 tablets |

METHOD

1. Granulation
    1. Dry starch in a hot air oven at 40°C until moisture is reduced to limit of 6 –9% w/w.
    2. Sieve each of the powders separately through a 40 mesh sieve.
    3. Place the active ingredient in a planetary mixer and gradually add the lactose with continual stirring.
    4. Add the icing sugar, starch and acacia, mixing for about five minutes after each addition, continue to mix for a further twenty minutes.
    5. With constant mixing, add sufficient water until a suitable granule consistency is obtained (approximately 1 liter
    6. Pass damp granules through a rotary granulator fitted with a 10 mesh screen.
    7. Dry the granules on trays at approximately 50°C.
2. Compression mixture
    1. Pass the dried granules through a 16 mesh screen.
    2. Sieve sufficient dried granules on a 40 mesh sieve to obtain approximately 500 grammes of fines.
    3. Mix the liquid paraffin with the fines and pass through a 20 mesh sieve.
    4. Pass the talc and magnesium stearate through a 20 mesh sieve.
    5. To the bulk of the granules in a planetary mixer add the lubricated fines, followed by the talc and magnesium stearate. Mix thoroughly for at lest 10 minutes after each addition, and finally for 20 minutes.
3. Tabletting Compress the tablets on a rotary machine using specified punches and limits of thickness.

Check weight of tablets - 10 tablets weigh 1.5 gms.
N.B. Coating

Tablets can be spray coated with specified film coating lacquer.

The compounds listed in the following table were made by processes similar to that described in Example 1.

Using the nomenclature of formula I $R_2$ was — $(CH_2)_n$— and $R_3$ and $R_4$ were both methyl except where indicated.

| Ex. No. | n | X | $R_1$ | Salt | m.p.°C |
|---|---|---|---|---|---|
| 15 | 2 | 0 | n-butyl | HBr | 184 |
| 16 | 2 | 0 | 3,5-dimethyl-4-chlorophenyl | HBr | 185–186 |
| 17 | 2 | 0 | 3-methyl-4-chlorophenyl | HBr | 183–184 |
| 18 | 2 | 0 | 3-trifluormethyl-phenyl | HBr | 210 |
| 19 | 2 | 0 | 2,4,5-trichloro-phenyl | HBr | 223–225 |
| 20 | 3 | 0 | 2,4,5-trichloro-phenyl | saccharinate | 208 |
| 21 | 3 | 0 | 2,4,5-trichloro-phenyl | citrate | 186–188 |
| 22 | 3 | 0 | 2,4,5-trichloro-phenyl | maleate | 186 |
| 23 | 4 | 0 | 2,4,5-trichloro-phenyl | acetate | 180 |
| 24 | 3 | 0 | 2,4,5-trichloro-phenyl | embonate | 140 |
| 25 | 3 | 0 | 2,4,5-trichloro-phenyl | gluconate | ca 85 |
| 26 | 3 | 0 | 2,4,5-trichloro- | cyclohexyl- | 178–179 |

| | | | | | |
|---|---|---|---|---|---|
| 27 | 3 | 0 | 2,4,5-trichlorophenyl | sulphamate ½pamoate | 150 |
| 28 | 3 | 0 | 2,4,5-trichlorophenyl | HCl | 201–204 |
| 29 | 4 | 0 | 2,4,5-trichlorophenyl | HBr | 190–193 |
| 30 | 3 | 0 | 2,4,5-trichlorophenyl | phosphate | 191–192 |
| 31 | 5 | 0 | 2,4,5-trichlorophenyl | HBr | 128–132 |
| 32 | 6 | 0 | 2,4,5-trichlorophenyl | HBr | 185–186 |
| 33 | 7 | 0 | 2,4,5-trichlorophenyl | HBr | 174–175 |
| 34 | 8 | 0 | 2,4,5-trichlorophenyl | HBr | 184–185 |
| 35 | 9 | 0 | 2,4,5-trichlorophenyl | HBr | 149–150 |
| 36 | 10 | 0 | 2,4,5-trichlorophenyl | HBr | 180–181 |
| 37 | 3 | 0 | 2,4,5-trichlorophenyl ($R_3R_4$-($CH_2$)-) | HBr | 193–197 |
| 38 | 2 | 0 | 4-nitrophenyl | HBr | 207 |
| 39 | 2 | 0 | 2,4-dichlorophenyl | HBr | 200–202 |
| 40 | 3 | 0 | 2,4-dichlorophenyl | HBr | 209–210 |
| 41 | 4 | 0 | 2,4-dichlorophenyl | HBr | 196–197 |
| 42 | 2 | 0 | 3,4-dichlorophenyl | HBr | 198–200 |
| 43 | 3 | 0 | 3,4-dichlorophenyl | HBr | 208–210 |
| 44 | 4 | 0 | 3,4-dichlorophenyl | HBr | 190–191 |
| 45 | 3 | 0 | 3,5-dimethylphenyl | HBr | 197–198 |
| 46 | 3 | 0 | (2-naphthyl) | HBr | 192–193 |
| 47 | 2 | 0 | 4-benzylphenyl | HBr | 171 |
| 48 | 2 | S | 2,5-dichloro-3-thienylmethyl | HBr | 175 |
| 49 | 2 | NG | phenyl | HBr | 175 |
| 50 | 3 | S | 4-chlorophenyl | HCl | 149 |
| 51 | 3 | 0 | 4-chlorophenyl | HBr | 205 |
| 52 | 3 | 0 | 2-methoxycarbonylphenyl | HBr | 135 |
| 53 | 2 | 0 | 4-methoxyphenyl | HBr | 193 |
| 54 | 3 | 0 | 4-tert-butylphenyl | HBr | 180 |
| 55 | 2 | 0 | 3,5-dimethylphenyl | HBr | 207 |
| 56 | 4 | 0 | 3-trifluoromethylphenyl | HBr | 157 |
| 57 | 2 | 0 | 4-chlorophenyl | HBr | 191 |
| 58 | 2 | 0 | 4-benzylphenyl ($R_3R_4$-($CH_2$)$_5$-) | HBr | 217 |
| 59 | 2 | $NC_2H_5$ | ethyl | HCl | 183–185 |
| 60 | 3 | $NC_2H_5$ | ethyl | HCl | 200 |
| 61 | 2 | $NCH_3$ | methyl | HCl | 192 |
| 62 | 2 | $NC_2H_5$ | ethyl ($R_3R_4$-$CH_2CH_2CH(CH_3)CH_2CH_2$-) | HCl | 207 |
| 63 | 2 | $NC_2H_5$ | ethyl ($R_3R_4$-($CH_2$)$_5$-) | HCl | 165–167 |
| 64 | 2 | $NCH_3$ | methyl ($R_3R_4$-$CH_2CH_2CH(CH_3)CH_2CH_2$-) | HCl | 182 |
| 65 | 2 | $NCH_3$ | methyl ($R_3R_4$-($CH_2$)$_5$-) | HCl | 218 |
| 66 | 3 | $NC_2H_5$ | ethyl ($R_3R_4$-$CH_2CH_2CH(CH_3)CH_2CH_2$-) | HCl | 191 |
| 67 | 3 | $NC_2H_5$ | ethyl ($R_3R_4$-($CH_2$)$_5$-) | HCl | 170–172 |
| 68 | 3 | 0 | o-bromophenyl | HBr | 180 |
| 69 | 3 | 0 | p-bromophenyl | Hr | 187 |
| 70 | 4 | 0 | p-chlorophenyl | HBr | 165 |
| 71 | 2 | 0 | p-chlorobenzyl | HBr | 211 |
| 72 | 6 | 0 | 3,4-dichlorophenyl | HBr | 191–193 |
| 73 | 3 | 0 | 2,4,6-trichlorophenyl | HBr | 198 |
| 74 | 4 | 0 | 2,4,6-trichlorophenyl | HBr | 168–170 |
| 75 | 4 | 0 | phenyl | HBr | 161–163 |
| 76 | 4 | 0 | 2,3-dimethylphenyl | HBr | 178–180 |
| 77 | 3 | 0 | 3,4-dimethylphenyl | Hr | 206–210 |
| 78 | 4 | 0 | 3,4-dimethylphenyl | HBr | ca 90 |
| 79 | 4 | 0 | 3,5-dimethylphenyl | HBr | 183–185 |
| 80 | 4 | 0 | 3-methyl-4-chlorophenyl | HBr | 182 |
| 81 | 4 | 0 | 2-cyclohexyl-4-chlorophenyl | HBr | 180 |
| 82 | 3 | 0 | pentachlorophenyl | HBr | 187 |
| 83 | 3 | S | pentachlorophenyl | HBr | 193–196 |
| 84 | 2 | NH | p-chlorophenyl | HBr | 178–180 |
| 85 | 3 | NH | p-chlorophenyl | HBr | 183–185 |
| 86 | 2 | NH | 2,4-dichlorophenyl | HBr | 200 |
| 87 | 3 | NH | 2,4-dichlorophenyl | HBr | 192 |
| 88 | 3 | NH | 2,6-dinitro-4-methylphenyl | HBr | 207 |
| 89 | 2 | NH | p-chlorobenzyl | HBr | 165–167 |
| 90 | 2 | N | (p-chlorobenzyl) p-chlorobenzyl | HBr | 184 |
| 91 | 2 | 0 | 1-naphthyl | HBr | 218 |
| 92 | 3 | 0 | 1-naphthyl | HBr | 191 |
| 93 | 4 | 0 | 1-naphthyl | HBr | 170–172 |
| 94 | 6 | 0 | 1-naphthyl | HBr | 180 |
| 95 | 4 | 0 | 2-naphthyl | HBr | 187 |
| 96 | 6 | 0 | 2-naphthyl | HBr | 165 |
| 97 | 2 | 0 | 4-chloro-1-naphthyl | HBr | 211 |
| 98 | 3 | 0 | 4-chloro-1-naphthyl | HBr | 191–193 |
| 99 | 6 | 0 | 4-chloro-1-naphthyl | HBr | 198 |
| 100 | 2 | 0 | 5,6,7,8-tetrahydro-2-naphthyl | HBr | 168–170 |
| 101 | 3 | 0 | 5,6,7,8-tetrahydro-2-naphthyl | HBr | 161–163 |
| 102 | 6 | 0 | 5,6,7,8-tetrahydro-2-naphthyl | HBr | 178–180 |
| 103 | 3 | 0 | 1-naphthyl ($R_3R_4$-($CH_2$)$_5$-) | HBr | 206–210 |
| 104 | 3 | 0 | cyclohexyl | HBr | ca 90 |
| 105 | 3 | NH | cyclohexyl | HBr | 183–185 |
| 106 | 3 | 0 | 2-chloro-4,5-dimethylphenyl | HBr | 182 |
| 107 | 3 | 0 | 2-isopropyl-5-methylphenyl | HBr | 180 |
| 108 | 2 | 0 | $CH_2$=CH-$CH_2$- | HBr | 160 |
| 109 | 2 | 0 | $CH_2Cl$-CHCl-$CH_2$- | Hr | 179 |

The following compounds were also made by a method similar to that described in Example 1 and chacterized.

EXAMPLE 110

4,6-Diamino-1,2-dihydro-2,2-dimethyl-1-[4-(2,4,5-trichlorophenoxy)-but-2-enyloxy]-1,3,5-triazine hydrobromide

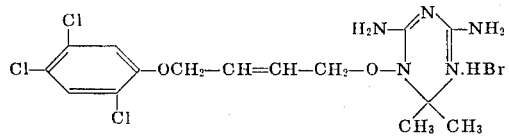

M.P. 197–198°C

EXAMPLE 111

4,6-diamino-1,2-dihydro-2,2-dimethyl-1-[4-(2,4,5-trichlorophenoxy)-2,3-dichlorobutyloxy]-1,3,5-triazine hydrobromide

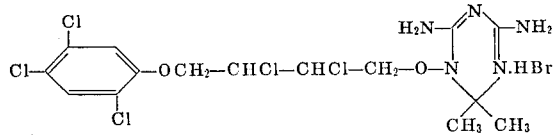

M.P. 191°C

EXAMPLE 112

4,6-Diamino-1,2-dihydro-2,2-dimethyl-1-[2-(p-chloro-phenoxy)-2,2-dimethylethyloxy]-1,3,5-triazine hydrobromide

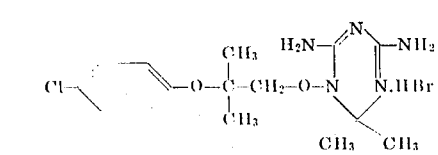

M.P. 252°C.

EXAMPLE 113

A mixture of 2 g. 4,6-diamino-1,2-dihydro-2,2-dimethyl-1-(2,4-dichlorobenzyloxypropyloxy)-1,3,5-triazine base and 10 ml. redistilled acetic anhydride was heated on the steam bath for 5 minutes and evaporated at reduced pressure. Crystallization of the residual solid from ethyl acetate-petroleum ether gave 1.7 g. product, m.p. 154°–156°. Further crystallization gave the diacetyl derivative of the triazine, m.p. 154°–155°.

EXAMPLE 114

A mixture of the foregoing triazine base of Example 113, 10 ml. redistilled acetic anhydride, and 5 ml. triethylamine was stirred at room temperature for 72 hours, poured onto ice, stirred for 30 minutes and extracted with ethyl acetate. After washing with water, the solution was dried, charcoaled, concentrated and petroleum ether added to give 0.7 g. of the tetraacetyl derivative. The melting point was unchanged on further crystallization, 124°–125°C.

EXAMPLE 115

In a similar method to that given in Example 114, 4,6-diamino-1,2-dihydro-2,2-dimethyl-1-[3'-(2,4,5-trichlorophenoxy)propyloxy]-triazine base was converted to its tetra-acetyl derivative, which after crystallization from ethanol-petrol ether had m.p 117°–118°.

We claim:

1. A compound of the formula:

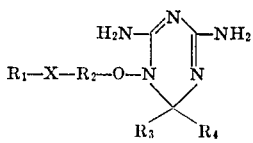

wherein $R_1$ is phenyl or naphthyl, phenyl or naphthyl substituted by halogen, nitro, halogeno-lower-alkyl, lower alkoxy, $C_1$–$C_8$ alkyl, $C_3$–$C_8$ cycloalkyl, $C_1$–$C_8$ alkoxycarbonyl, benzyl, carboxy, hydroxyl, mercapto, cyano, methoxyl or sulphonamido;

$R_2$ is alkylene of two to six carbon atoms substituted by halogen;

$R_3$ is hydrogen or methyl;

$R_4$ is methyl or together with $R_3$ and the two-carbon atom of the triazine ring is spirocycloalkane or methylspirocycloalkane; and X is oxygen, sulphur or $NR_5$ where $R_5$ is hydrogen, methyl or ethyl; or a non-toxic acid addition salt or one to seven carbon atom alkanoyl compound thereof.

2. A compound of claim 1, wherein $R_3$ and $R_4$ are both methyl, $R_2$ is alkylene of two to four carbon atoms and X is oxygen.

3. A compound of claim 1, wherein $R_1$ is phenyl or halogeno-, alkyl-, nitro-, methoxyl- or trifluoromethylphenyl.

4. A compound of claim 3, wherein $R_1$ is mono-, di-, tri- or tetrahalogeno-phenyl.

5. A compound of claim 4, wherein $R_1$ is dichlorophenyl or trichlorophenyl.

6. A compound of claim 1 which is 4,6-diamino-1,2-dihydro-2,2-dimethyl-1-[3'-(2,4,5-trichlorophenoxy)-propyloxy]-1,3,5-triazine or a non-toxic acid salt or an acetyl derivative thereof.

* * * * *

UNITED STATES PATENT OFFICE
CERTIFICATE OF CORRECTION

Patent No. 3,723,429  Dated March 27, 1973

Inventor(s) Patrick Mamalis et al.

It is certified that error appears in the above-identified patent and that said Letters Patent are hereby corrected as shown below:

In the heading insert priority, British application 55428/68 filed November 22, 1968, British application 11866/69 filed March 6, 1969.

In the heading "Middlese" should read --Middlesex--.

Column 1, line 27, "unsubstititued" should read --unsubstituted--;

line 32, "lowr" should read --lower--;

line 53, "ylethy" should read --ylethyl--;

bottom line, "halogeneo" should read --halogeno--;

Column 2, line 21, "substitued" should read --substituted--;

line 45, left hand structural formula Ia should read: --

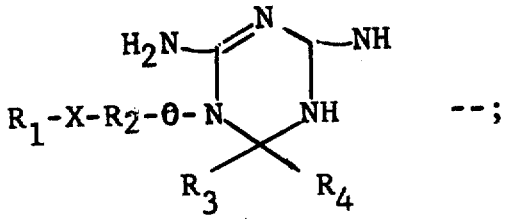

--;

Column 3, line 9, "quantitis" should read --quantities--;

line 43, "lasmodium" should read --Plasmodium--;

Line 52, "diuanide" should read -- diguanide -- line 59, "f" should read --of--;

UNITED STATES PATENT OFFICE
CERTIFICATE OF CORRECTION

Patent No. 3,723,429      Dated March 27, 1973

Inventor(s)   Patrick Mamalis et al.      Page - 2

It is certified that error appears in the above-identified patent and that said Letters Patent are hereby corrected as shown below:

Column 4, line 25, "presenJ" should read --present--;

lines 35 and 64, "trianzine" should read --triazine--;

line 49, "hydroxyJriazine" should read --hydroxytriazine --;

Column 5, line 64, "he" should read --the--;

Column 6, line 4, "$R_2 40$" should read --$R_2'$--;

Column 7, line 26, "provids" should read --provides--;

line 43, "capsultes" should read --capsules--;

line 46, "capsuls" should read --capsules--;

Column 8, line 3, "does" should read --dose--;

Column 10, line 64, "un or" should read --under--;

Column 11, line 18, "redcued" should read --reduced--;

line 21, "slidifies" should read --solidifies--;

Column 12, line 34, "there" should read --ether--;

Column 15, lines 7, 8, 28 and 29, "formdimethylamide" should read --dimethylformamide--;

line 11, "vaporated" should read --evaporated--;

line 35, "ti" should read --to--;

UNITED STATES PATENT OFFICE
CERTIFICATE OF CORRECTION

Patent No. 3,723,429  Dated March 27, 1973

Inventor(s) Patrick Mamalis et al.   Page - 3

It is certified that error appears in the above-identified patent and that said Letters Patent are hereby corrected as shown below:

line 45, "tital" should read --title--;

line 52, at the end of line delete "l";

Column 16, line 33, "lest" should read --least--;

Column 18, line 27, "chacterized" should read -characterized--;

left hand portion of structural formula at bottom of column should read--

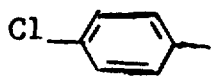

--.

Signed and sealed this 28th day of August 1973.

(SEAL)
Attest:

EDWARD M. FLETCHER, JR.  RENE D. TEGTMEYER
Attesting Officer  Acting Commissioner of Patents